Patented Sept. 18, 1934

1,973,991

UNITED STATES PATENT OFFICE 1,973,991

BITUMINOUS EMULSION

Claude L. McKesson and Lyndon G. Thompson, Oakland, and Walter D. Buckley, Berkeley, Calif., assignors to American Bitumuls Company, San Francisco, Calif., a corporation of Delaware No Drawing. Application December 14, 1931, Serial No. 581,058

16 Claims. (Cl. 134—1)

The invention relates to the manufacture of emulsions or dispersions and has to do particularly with the treatment of bituminous emulsions whereby they are rendered resistant to the influences which ordinarily result in premature decomposition, break-down, inversion or sedimentation.

The term bituminous emulsions comprehends emulsions or dispersions of asphalt, pitch, tar, wax and the like in an aqueous vehicle, such as are well known in the art of paving, roofing, waterproofing and impregnation, and in which the aqueous vehicle is in the continuous or external phase.

These emulsions may be made with the aid of soaps, clays, starches and other emulsifiers or they may be produced by processes in which no substantial amounts of such emulsifiers are employed, as for instance, in accordance with the teachings of Braun, United States Patent No. 1,737,491, by which bituminous emulsions are produced by adding bituminous materials and weakly alkaline water to a preformed emulsion, and in accordance with Montgomerie United States Patent No. 1,643,675 under which melted asphalt is mixed with a heated alkaline caustic solution.

It is customary to manufacture such emulsions or dispersions at a central depot, storing them in metal tanks, transporting them in barrels or other containers to the places of use and then mixing them with other materials or applying them direct in the well known processes of utilization.

Generally speaking these emulsions or dispersions are sensitive to heat and cold and to the addition of water and foreign matter such as rust, salt and the like, so that exposure to the elements during storage and transportation, or the intentional addition of water for dilution may impair their quality and cause premature decomposition, break-down, inversion or sedimentation.

One of the most serious obstacles to handling or using bituminous emulsions during the winter season or otherwise where extremes of cold are encountered, is the effect of freezing which may so alter the character of the emulsions on subsequent thawing as to render them totally unfit for use.

An object of the invention is to provide a method of stabilizing bituminous emulsions so that their essential characteristics remain unimpaired for substantial periods of time.

Another object is to disclose a method of treating emulsions ordinarily immiscible with water so that they may be diluted with water.

Another object is to develop a method of treating bituminous emulsions to render them stable against premature break-down when mixed with rock, sand or other aggregates.

Another object is to produce a bituminous emulsion capable of standing freezing temperatures, which on thawing thereafter resumes its original character.

Another object is to disclose a stabilizing agent which when added to a bituminous emulsion renders the same resistant to the effects of temperature extremes and the addition of foreign materials.

Other objects will be apparent from the following discussion and the description of methods for carrying out the invention and of the materials suitable therefor.

Many materials have been proposed in the past for stabilizing emulsions, and special products have been described for the purpose of rendering bituminous emulsions resistant to the effects of freezing. Among the latter are polymerized fatty acid soaps and such materials as glycerine, alcohol or molasses, which generally lower the freezing temperature of the water present in the emulsions and in which they are soluble. These materials have been employed in proportions up to ten percent by weight of the emulsion, the preferred ratios being about five percent for the polymerized soap and from two to five percent for the other materials.

It has been discovered that the addition of small amounts of the water soluble salts of glycocholic acid or taurocholic acid when added to bituminous emulsions of well known types enables the emulsions to withstand repeated exposures to temperatures as low as zero Fahrenheit without damage. Such treated emulsions suitable for paving purposes on being brought to summer heat after being subjected to repeated freezing temperatures were found to be unchanged in quality and entirely suitable for use.

In somewhat larger proportions the same materials added to an emulsion, ordinarily unstable to the addition of mineral aggregates, were found capable of producing a product suitable for mixing with mineral aggregates in the manufacture of asphaltic concrete, without premature break-down or agglomeration.

The theory on which the new stabilizing agent functions is not entirely clear but its effectiveness is remarkable considering the small proportions necessary to accomplish the results. For instance, with an asphaltic emulsion prepared by the process of Braun Patent No. 1,737,491 or that of Montgomerie Patent No. 1,643,675, proportions as low as one tenth of one percent by weight on the finished emulsion were found to be effective against damage by freezing, and in making emulsions suitable for mixing with mineral aggregates, proportions between three tenths and six tenths of one percent were found to be generally sufficient.

Emulsions of this type are generally termed quick-breaking emulsions and when mixed with dry mineral aggregates there is a tendency toward premature separation of the constituents so that the asphalt accumulates in agglomerated masses throughout the mixture without properly coating the individual particles. It has been found that the addition of about six tenths of one percent of concentrated ox gall dissolved in twice its weight of water, to such emulsions so changes their character that they may be readily mixed with mineral aggregates without breakdown, affording a thorough coating of particles even as fine as crusher dust.

The effectiveness of the stabilizing agent does not depend on the particular method by which it is incorporated in the emulsion as it has been found that the salts may be dissolved in the water which is used during the process of emulsification, or added to the completely finished emulsion without appreciable difference in result.

Suitable water soluble salts of glycocholic and taurocholic acids may be glycocholates or taurocholates, as of ammonium, potassium or sodium, the sodium glycocholates and taurocholates being satisfactory and readily obtainable commercially.

These salts are commonly termed bile salts and are usually found in combination in the bile of animals, sodium glycocholate being more abundant in the case of herbivora, sodium taurocholate in flesh-eating animals, and while the commercially pure salts are satisfactory for carrying out the invention it is not necessary to use them separately or even uncontaminated with other materials as naturally occurring in animal tissues and fluids.

For example, ox gall which, in addition to the bile salts, may contain cholesterol, fats and mucinoid material, pigment, etc. is quite satisfactory for the purposes of the invention and pig gall and other animal galls may be used.

While specific proportions of bile salts have been mentioned as satisfactory and while proportions up to one percent by weight of the finished emulsion have been found to meet the most drastic requirements, it is not intended to limit the invention to any particular percentages or range of percentages, nor to any particular form in which the bile salts are employed.

It will be apparent to those skilled in the art that modifications in proportions and methods may be employed without departing from the spirit of the invention which embraces all such modifications and changes within the scope of the following appended claims.

We claim:

1. The method of stabilizing bituminous emulsions which comprises adding bile salts to a preformed emulsion.

2. The method of stabilizing bituminous emulsions which comprises adding ox gall to a preformed emulsion.

3. The method of stabilizing bituminous emulsions which comprises adding water-soluble salts of glycocholic and taurocholic acids to a preformed emulsion.

4. The method of stabilizing bituminous emulsions which comprises adding sodium glycocholate and sodium taurocholate to a preformed emulsion.

5. The method of increasing the stability of bituminous dispersions of the oil-in-water type which comprises adding bile salts to a finished dispersion.

6. The method of increasing the stability of bituminous dispersions of the oil-in-water type which comprises adding ox gall to a finished dispersion.

7. The method of increasing the stability of bituminous dispersions of the oil-in-water type which comprises adding water-soluble salts of glycocholic acid and taurocholic acid to a finished dispersion.

8. The method of increasing the stability of bituminous dispersions of the oil-in-water type which comprises adding sodium glycocholate and sodium taurocholate to a finished dispersion.

9. The method of treating bituminous emulsions of the quick-breaking type to prevent premature break-down when mixed with mineral aggregates, which comprises adding bile salts thereto.

10. The method of treating bituminous emulsions of the quick-breaking type to prevent premature break-down when mixed with mineral aggregates, which comprises adding ox gall thereto.

11. The method of treating bituminous emulsions of the quick-breaking type to prevent premature break-down when mixed with mineral aggregates, which comprises adding water-soluble salts of glycocholic and taurocholic acids thereto.

12. The method of treating bituminous emulsions of the quick-breaking type to prevent premature break-down when mixed with mineral aggregates, which comprises adding sodium glycocholate and sodium taurocholate thereto.

13. A stabilized dispersion of bitumen in water, containing bile salts.

14. A stabilized dispersion of bitumen in water, containing ox gall.

15. A stabilized dispersion of bitumen in water, containing water-soluble salts of glycocholic and taurocholic acids.

16. A stabilized dispersion of bitumen in water, containing sodium glycocholate and sodium taurocholate.

CLAUDE L. McKESSON.
LYNDON G. THOMPSON.
WALTER D. BUCKLEY.